United States Patent [19]

Hendrickson et al.

[11] Patent Number: 4,558,360
[45] Date of Patent: Dec. 10, 1985

[54] DECODER LOCKOUT DEFEAT CIRCUIT

[75] Inventors: Melvin C. Hendrickson, Elmhurst; Robert L. Sproston, Jr., Mt. Prospect, both of Ill.

[73] Assignee: Zenith Electronics Corporation, Glenview, Ill.

[21] Appl. No.: 538,259

[22] Filed: Oct. 3, 1983

[51] Int. Cl.[4] ............................................. H04N 7/167
[52] U.S. Cl. .................................... 358/120; 328/155
[58] Field of Search ...................... 358/120; 328/155; 307/262

[56] References Cited

U.S. PATENT DOCUMENTS

| 4,029,900 | 6/1977 | Addeo | 328/155 |
| 4,222,068 | 9/1980 | Thompson | 358/120 |
| 4,354,164 | 10/1982 | Gupta | 328/155 |
| 4,419,760 | 12/1983 | Bjornholt | 328/155 |
| 4,489,347 | 12/1984 | Tentler | 358/120 |

Primary Examiner—S. C. Buczinski
Assistant Examiner—Linda J. Wallace

[57] ABSTRACT

A suppressed sync television decoder includes a phase locked horizontal oscillator for controlling operation of a suppressed sync detector which supplies a circuit for restoring suppressed sync in a television signal. The restored sync is coupled to the phase locked oscillator and to a first four bit counter. A second four bit counter is supplied with the horizontal oscillator signal and inhibits counting in both counters when it counts 16. A reset signal corresponding to the end of the vertical interval initializes both counters. If the number of sync pulses counted by the second counter is less than 16, an error signal is produced. Thirty-two error signals result in generation of a defeat pulse to unlock the oscillator.

10 Claims, 1 Drawing Figure

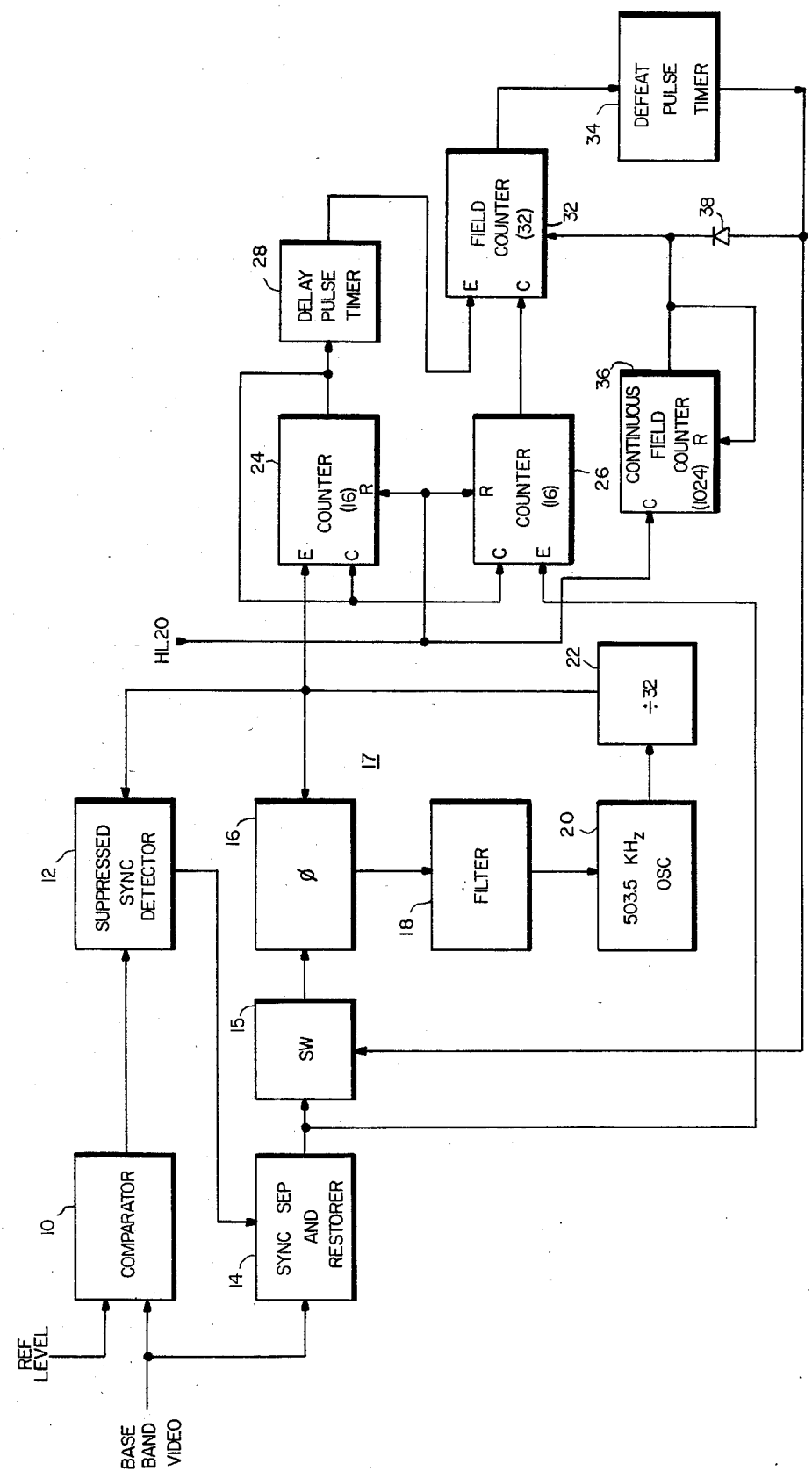

DECODER LOCKOUT DEFEAT CIRCUIT

BACKGROUND OF THE INVENTION AND PRIOR ART

This invention relates in general to television decoders and particularly to cable television decoders used for decoding television signals that include suppressed horizontal synchronizing pulses.

With the advent of subscription or "pay" television, various forms of encoding a television signal to restrict program viewing to subscribers having appropriate decoders has become very popular. One very common system randomly suppresses the synchronizing pulses and also inverts video information on a random field basis. Subscribers have suitable decoders which include a phase locked horizontal oscillator that, when unlocked, free runs at the horizontal frequency rate. A suppressed sync detector and restorer circuit samples the television signal when a sync pulse is expected, determining whether the sync pulse is suppressed, and if so, restores it. Such systems are well known in the art.

An occasional problem manifests itself in one such system when static video material is transmitted. The phase locked oscillator will often mistake the static video information for a synchronizing pulse and lock to it. Such a condition, called video lock out, will persist as long as the video remains static.

In the signal in that system, no suppression of sync is permitted during the vertical interval. It is during this portion of the signal, when unsuppressed sync pulses are present, that locking of the horizontal oscillator should occur. However, the phase lock loop may require a substantial number of fields before it is completely stabilized and properly restores all of the sync pulses that have been suppressed. The reasons for the oscillator failing to lock during the vertical interval are believed to be related to the disturbing effect that the vertical sync pulse and equalizing pulses have on the phase lock loop. Should the video information be negative going, i.e. have the same polarity as the sync pulses, the potentiality for video lock-out by the suppressed sync detector system mistaking static video for sync pulses is enhanced.

The problem is exacerbated because of the sync generating baseband decoders often used by cable operators for supplying coded television signals to their cable customers. A failure of a baseband decoder to properly sense suppressed sync denies service to all customers on the cable. Further, the cable operator usually tests equipment operation at remote locations by using color bars and other static test patterns and video lock out effectively precludes such testing.

OBJECTS OF THE INVENTION

The principal object of the invention is to provide an improved television decoder.

A further object of the invention is to provide a suppressed sync television decoder which solves a problem of prior art decoders.

Another object of the invention is to provide a suppressed sync television decoder which defeats video lock-out.

SUMMARY OF THE INVENTION

In accordance with the invention, a television decoder includes a phase locked oscillator for developing a horizontal rate signal for controlling operation of suppressed sync detector means for detecting and restoring suppressed sync pulses in a received television signal. Means are provided for determining a video lock out condition in the decoder by counting the number of sync pulses in a given time period following the vertical interval. Means are included for breaking the lock of the phase locked oscillator if the number of sync pulses is insufficient.

BRIEF DESCRIPTION OF THE DRAWINGS

These and other objects of the invention will be apparent upon reading the following description in conjuction with the drawing, the single figure of which represents a block diagram of a television decoder constructed in accordance with the invention.

DESCRIPTION OF THE PREFERRED EMBODIMENT

Referring to the drawing, a base band video signal with suppressed sync is supplied to a sync separator and restorer circuit 14 and to a comparator 10, which also receives a reference level input signal. Comparator 10 acts on the base band signal and the reference level signal in a well known manner and supplies a bi-level base band signal to a suppressed sync detector 12, which also receives an input from a phase locked oscillator circuit 17. The output of sync detector 12 is supplied to sync separator and restorer 14. Restored sync pulses from the sync separator and restorer 14 are supplied, through an electronic switch 15, to a phase detector 16 in phase locked oscillator 17. Specifically, phase detector 16 supplies a filter 18 which, in turn, is coupled to a 503.5 KHz oscillator 20. The output of the oscillator is supplied to a counter 22 which divides the frequency by 32. The normal "free running" frequency output signal is thus very close to the standard 15.750 KHz television line frequency. The oscillator signal is supplied back to phase detector 16 and suppressed sync detector 12.

The circuit thus far described, with the exception of switch 15, is conventional and well known in the art and functions to restore suppressed sync pulses in a suppressed sync encoded television signal. Phase locked oscillator 17 responds to the composite sync in the television signal to generate a sampling signal identifying the horizontal sync intervals, which signal is applied to the suppressed sync detector for determining whether sync is suppressed or not. As mentioned, normal horizontal sync pulses are always transmitted during the vertical interval to permit the phase locked oscillator to properly lock and generate a correct sampling signal. However, a delay in locking will render the system susceptible to static video information which may be mistaken for suppressed sync pulses. Should that occur, the pulses of the sampling signal may not be generated at the times when horizontal sync is present, but rather may "see" the static video. Consequently, sync pulses will not be properly restored and a video lock-out condition will prevail.

The invention recognizes the fact that, in a properly operating decoder, the output of the sync restorer will have a given number of sync pulses in a predetemined time interval, whereas in an improperly operating decoder, the output of the sync restorer will include a lesser number of pulses. A time period is established when proper horizontal sync pulses are to be expected and determines whether the output of the sync restorer includes the requisite number of pulses during that period. It is recognized that, even under transient conditions that result in proper phase locking of the oscillator, a number of fields that include improperly restored sync pulses may be present. To minimize erroneous determinations of video lock out, a fairly large number of error signals are detected before generating a defeat pulse for unlocking the phase locked oscillator. As will be seen, the circuitry of the invention requires 32 errors which corresponds to 32 fields of improper sync pulse restoration before generating a defeat signal. The defeat signal, which removes the restored sync input to the phase detector, is maintained for approximately one-half second to assure that the oscillator is fully unlocked and free running. The cycle is then repeated with the decoder attempting to properly phase lock the oscillator.

Referring back to the drawing, two 16 bit counters 24 and 26 are provided, with the enable input of counter 24 being supplied with the oscillator signal and the enable input of counter 26 being supplied with the restored sync output. The clock inputs of both counters are coupled to the output of 16 bit counter 24. Thus, the output of counter 24 inhibits further counting in both counters 24 and 26 when counter 24 attains a 16 count. The counters are reset by a reset signal indicated as HL20, which corresponds to the occurrence of horizontal line number 20, marking the end of the vertical interval in a standard television signal. Thus, both counters 24 and 26 are set to begin counting at the same time, namely at the end of the vertical interval.

The output of counter 26 is supplied to the clock input of a field counter 32 which has its enable input coupled to the output of delay pulse timer 28. Counter 26 produces a different output when it attains a count of 16 than for counts of less than 16 and thus supplies field counter 32 with an appropriate clock signal whenever counter 26 detects an error in the number of sync pulses. Delay pulse timer 28 assures a slight delay in the enable signal to field counter 32. Field counter 32 registers a count when enabled by delay pulse timer 28 if its clock input indicates an error in the number of sync pulses counted by counter 26. There must be 32 fields of erroneous sync before a signal is supplied to defeat pulse timer 34 which generates the defeat pulse and maintains it for a preselected period of time to assure that the horizontal phase lock loop is unlocked and to reset field counter 32. The defeat pulse also opens electronic switch 15 and keeps it open for about one-half second, which has been found adequate for the oscillator to revert to its free running state.

It should be apparent that the circuit described operates continuously. A partial count may exist in field counter 32 as a result of a number of erroneous fields of sync having been recorded. Thus an occasional normal phase locking operation would be defeated because of field counter 32 having accumulated a number of errors during previous decoder operation. In that event, a defeat signal may be generated by less than the normal 32 fields of error being detected for a given locking sequence.

To minimize that occurrence a 1024 is clocked by HL20 and connected to reset itself and field counter 32 every 1024 fields. This effectively prevents any count build up in counter 32 and eliminates spurious unlocking of the oscillator. A diode 38 prevents the output pulse from counter 36 from opening switch 15.

To recapitulate, the system of the invention looks for 16 sync pulses in the output of the restorer in a predetermined interval when it is known that there should be 16 pulses. If less than 16 pulses are present in that interval, an error signal is developed for that field. When 32 such fields are counted, a defeat pulse of one-half second duration is generated to unlock the oscillator, allowing it to free run and attempt to relock in the right condition. If it again fails to properly lock, the sequence is repeated.

What has been described is a novel lock-out defeat circuit for a suppressed sync television signal decoder. It is recognized that numerous modifications and changes in the described embodiment of the invention will be apparent to those skilled in the art without departing from the true spirit and scope thereof. The invention is to be limited only as defined in the claims.

What is claimed is:

1. In a television decoder of the type including a phase locked oscillator developing a horizontal rate signal for controlling operation of suppressed sync detector means for detecting and restoring suppressed sync signals in a received television signal, the improvement comprising:
means for determining a video lock-out condition by counting the number of sync pulses in a given time period following the television signal vertical interval and;
means for breaking the lock of said phase locked oscillator if said number of sync pulses is insufficient.

2. A television decoder as set forth in claim 1, including counter means for determining said given time period.

3. A television decoder as set forth in claim 2, including means for enabling said counter means at the end of said vertical interval.

4. A television decoder as set forth in claim 3 wherein said counter means include one input supplied from said phase locked oscillator and another input supplied from said suppressed sync detector means.

5. A television decoder as set forth in claim 4, wherein said counter means comprise first and second four bit counters, said first counter being driven by said oscillator and said second counter being driven by said suppressed sync detector means, and further including;
means applying a reset signal for resetting both said counters at the end of said vertical interval;
means for inhibiting counting by both said counters when said first counter reaches a predetermined count; and
means producing an error signal if the count in said second counter is less than the count in said first counter.

6. A television decoder as set forth in claim 5 further including a third counter coupled to the output of said second counter;
means for clocking said third counter with said reset signal to count error signals; and
means responsive to said third counter for developing a defeat signal for breaking the lock of said phase locked oscillator.

7. A television decoder as set forth in claim 6 wherein said means for developing said defeat signal comprises a timer coupled to the output of said third counter for assuring a minimum duration for said defeat signal.

8. A television decoder comprising:
a phase locked oscillator;
a suppressed sync detector coupled to said oscillator;

means supplying television signal to said suppressed sync detector;

a sync pulse separator and restorer receiving said television signal and the output of said suppressed sync detector for providing restored synchronizing pulses;

means coupling said restored synchronizing pulses to said phase locked oscillator; and video lock-out defeat means for generating a defeat signal to unlock said phase locked oscillator in the event said phase locked oscillator is locked to video rather than sync pulses comprising:

a first counter coupled to the output of said oscillator;

a second counter coupled to the output of said sync pulse separator and restorer;

means for resetting both said counters at the end of the vertical interval in said television signal;

means for inhibiting counting by both said counters when said first counter reaches a predetermined count;

means for developing error signals when said second counter attains counts less than said first counter; and means for developing a defeat pulse responsive to said error signals.

9. A television decoder as set forth in claim 8 wherein said inhibiting means includes a detector for disabling both said counters when said first counter reaches 16, and wherein a further counter is included for counting the number of fields including erroneous restored sync pulses.

10. A television decoder as set forth in claim 9 further including a timer for assuring that the defeat signal has a minimum duration for unlocking said horizontal phase locked oscillator.

* * * * *